INVENTORS
RALPH V. ANDES
DONALD M. MANIKOWSKI

BY *Meyers & Peterson*

ATTORNEYS

United States Patent Office 3,454,414
Patented July 8, 1969

3,454,414
PHOTOCHROMIC MATERIAL
Ralph V. Andes, Stillwater, and Donald M. Manikowski, Minneapolis, Minn., assignors to Sperry Rand Corporation, New York, N.Y., a corporation of Delaware
Filed Nov. 2, 1964, Ser. No. 408,199
Int. Cl. B29d 11/00; C03c 17/32
U.S. Cl. 117—33.3     9 Claims

ABSTRACT OF THE DISCLOSURE

Photochromic means particularly adapted for use in data storage or processing systems, the photochromic material being a film of beta-salicylidine aniline dispersed in a vinyl binder, the dispersion being preferably disposed on the surface of a substrate, the binder consisting essentially of a polymer which is the reaction product of a mixture of vinyl chloride and vinyl acetate, the binder comprising between about 5 percent and 30 percent of the dispersion composition.

---

Figure 1:
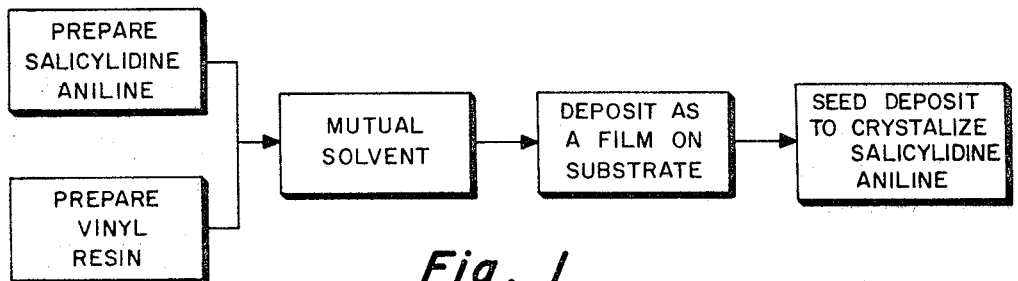

The present invention relates generally to the preparation of an improved photochromic material which is capable of undergoing a color change from one stable state to another, one color representing an inactive or nonilluminated state, and the other representing an active or irradiated state. When the material of the invention is irradiated by electromagnetic radiation in the ultraviolet range while it is in the inactive color state, the change occurs extremely rapidly, and the change in color state is retained by the material over an extended period of time. A stable reversal to the inactive state may be accomplished by irradiation with radiation having a wave length longer than the ultraviolet, such as in the visible or infra-red range. The invention further relates to the combining of the photochromic material with a carrier material which will permit the substance to be prepared as a thin film or coating on a transparent base, thus making it possible for the immediate state or photo characteristics of the material to be readily ascertained by light transmission techniques. Obviously, light reflection techniques may be employed to determine the state of the material, however, transmission is generally the preferred method of determination.

Photochromic materials which will rapidly undergo a color change from one state to a second state, and which are sufficiently stable so as to retain either of the states over an extended period of time are uniquely suited for use in data processing applications, such as for the storage of binary data. In addition, the material may be utilized as a photochromic display on projection screens or the like. In working with photochromic materials, particularly as data storage elements for the storage of binary data, it is preferable that the material be capable of use as a transparent coating or film while disposed on a transparent substrate or base. Furthermore, it is critical that the material have a crystalline structure which is capable of undergoing a color change upon exposure to certain forms of radiation, the change being detectable with the material being widely dispersed so as to render the film or coating substantially transparent.

Briefly, in accordance with the present invention, the improved photochromic material is an anil such as salicylidine aniline which is dispersed in a particular class of vinyl binder. The vinyl binder, which is selected because of its compatibility with the crystalline state of the photochromic anil, is preferably the copolymeric reaction product of vinyl chloride and vinyl acetate. The resin together with the anil may be prepared, for example, in a solvent which is mutually compatible to both resin and anil components, and which solvent may be easily removed from the mixture. After the mutual solvent, preferably a relatively low boiling ketone, has been added to the anil and resin, and a mixture prepared, the solvent is permitted to evaporate and the anil in the resulting oily film crystalize substantially concurrently. Normally, the anil is permitted to become super-saturated in the solution including the solvent, and the mixture is then inoculated or seeded with a small amount of an anil having the desired crystalline form to provide the desired crystalline form in the product material. Of course, other procedures may be used to prepare the proper crystals, however, the inoculation technique has been found to be highly dependable. This resulting crystalline product material normally assumes an inactive, relaxed, or normal yellow state while in the dark or when exposed to light in the visible range, and will be activated or converted to a substantially more highly red state upon being subjected to incident electromagnetic radiation, preferably in the ultraviolet range. In other words, radiation in the visible or even infrared range has the effect of converting or driving the material to one stable state, the yellow state, while exposure to the ultraviolet has the effect of converting or driving the material to a second stable state, the red state. For converting or driving to the yellow state, the material may alternatively be subjected to a slightly elevated temperature, however, this technique is much slower. Of course, infrared radiation may be employed to generate heat as a secondary phenomenon to cause the material to be driven to the yellow state, if desired.

Beta salicylidine aniline, in either the yellow or red forms, has substantial spectral absorption in the ultraviolet, violet, and blue spectral ranges. In the yellow form, the spectral absorption decreases, and the transmission correspondingly increases until a maximum of transmission is reached at a range of about 5,000 angstroms. In the red form, however, the spectral transmission in the short wave lengths coincides with the yellow form, and increases as the wave length increases from the ultraviolet and blue ranges. However, a first transmission peak is reached at about 4,200 angstroms, and thereafter the transmission decreases sharply until a minimum transmission point is reached at about 4,800 angstroms. Thereafter, the transmission increases sharply with an increase in wave length until a maximum is reached at about 5,300 angstroms. The spectral transmission curves for either the yellow or the red forms are therefore substantially coincidential in the ultraviolet, violet, and blue spectral ranges, and also in the spectral ranges above about 5,500 angstroms; however, the transmission characteristics vary sharply at the spectral range of about 4,800 angstroms, this being minimum point for beta-salicylidine aniline in the red form.

Beta-salicylidine aniline is preferred for data processing applications inasmuch as it has a substantially longer stability while maintained in the red form in a drak environment. While it is correspondingly necessary to expose the red form to a substantially greater quantity of energy in order to convert it to the yellow form, the magnitude of radiant energy required is not unreasonable and is substantially similar to the quantity required to convert the material from the yellow form to the red form.

Therefore, it is an object of the present invention to provide improved photochromic material which has two stable states and which may be prepared as a film suitable for use as an information storage element for retention of binary data.

It is a further object of the present invention to provide an improved transparent film of a bistable photochromic material which retains a certain predetermined color based upon the exposure history of the material to incident electromagnetic radiation.

It is a further object of the present invention to provide an improved film of a bistable photochromic material adapted for use as an information storage element, the material being capable of transformation between a certain activated red state and a certain normal, inactive, or yellow state when exposed to specific incident radiation, the material being capable of being driven to the activated state by exposure to ultraviolet radiation, and capable of being returned or driven to the normal or inactive state by means of subjection to light in the visible or infrared range.

It is yet a further object of the present invention to provide an improved bistable photochromic material which is capable of being applied as a film on a transparent substrate base, the composite film and substrate being capable of transmitting an incident interrogating light, preferably in the form of an interrogating pulse, the degree of light transmission of the interrogating pulse being dependent upon the immediate specific stable state of the photochromic material in the film.

Figure 2:
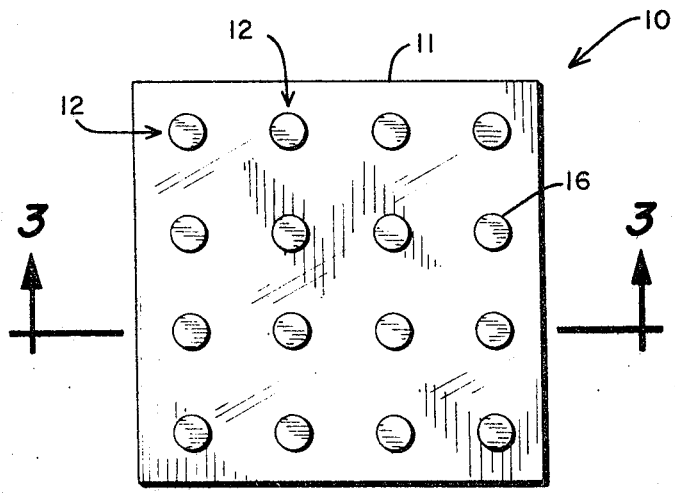
Figure 3:
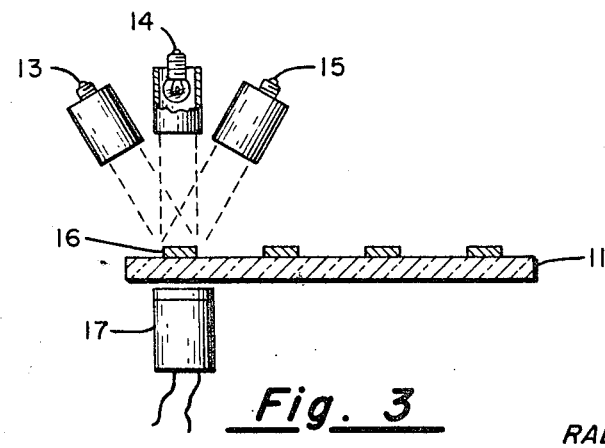

Other and further objects of the present invention twill become apparent to those skilled in the art upon consideration of the following description, appended claims, and accompanying drawing wherein:

FIGURE 1 is a flow diagram illustrating one preferred method of preparing the photochromic material of the present invention;

FIGURE 2 is a top plan view of a substrate which has been covered by a number of individual discrete areas of the photochromic material of the present invention, the discrete areas being arranged in a pattern of rows and columns; and FIGURE 3 is a vertical sectional view taken along the line and in the direction of the arrows 3—3 of FIGURE 2 and illustrating components or equipment utilized in combination with the photochromic films for data processing operations.

In accordance with the preferred modification of the present invention, a bistable photochromic material is prepared by means of dissolving a salicylal anil and a vinyl resin, such as the resin copolymer reaction product of vinyl chloride and vinyl acetate, in a mutual solvent consisting essentially of a low boiling ketone. In this connection, the preferred vinyl resin copolymer may contain between about 85 percent and 95 percent of vinyl chloride, balance vinyl acetate. It has also been found that a vinyl resin copolymer having a composition within this range, or one which may include up to about 6 percent of vinyl alcohol as a component in an interpolymer may be employed as well. Thus, from 0 percent up to about 6 percent of vinyl alcohol may be employed. These specific resin compositions have been found to be highly compatible with the anil. The crystalline structure of the film which is formed is extremely fine, nongrainy, and capable of transmitting incident radiation with a minimum of reflection. The ketones which are mutually compatible with the resin and the anil are preferably the low boiling ketones, some examples of which are acetone, cyclohexaneone, tetrahydrofurane, isofurone, and methyl-isobutyl ketone. The anil is preferably salicylidine aniline, and for use as a photochromic material for data processing or data storage as hereinabove described, the anil must be in the beta crystalline form. While the crystalline structure of the alpha and beta forms are similar, differences are detectible upon X-ray diffraction investigation and the forms thereby recognized. It is believed that the resin and the anil exist in the mixture in two separate phases, that is, the vinyl resin physically retains the crystalline anil as a separate component in the mixture.

The range of materials used may include between about 5 percent and 30 percent of resin polymer, balance anil. If more than 30 percent of resin polymer is employed, the optical effectiveness of the film is lowered, while if less than 5 percent is utilized, the material loses its capability of forming films. The preferred composition range is between 7 percent and 10 percent of resin polymer, balance anil.

If the anil is dispersed in a water soluble resin, such as methyl cellulose or the like, the material crystallizes on the substrate in an undesirable manner and the resulting product is accordingly usable only on a reflection determination basis. Cellulose nitrate, when used as a binder, tends to form a hard crystalline deposit incapable of use in a light transmission system, and hence the structure is likewise only usable on a reflection basis. Polymethyl-methacrylate has been found to destroy the photochromic behavior of the anil. Polyvinyl alcohol emulsions do not suitably dissolve the anil and hence the films obtained therefrom are generally opaque in nature and cannot be made useful.

After the mixture has been prepared, the anil having been inoculated with an appropriate seed crystal, it is coated or placed on the surface of a suitable substrate such as lantern slide glass by means of a suitable masking technique, such as by using a closely spaced stencil form or the like in combination with the substrate. The material is permitted to dry by removal of the solvent therein, and it will then adhere tenaciously to the surface of the substrate. Referring now to FIGURES 2 and 3, it will be seen that the information storage plate generally designated 10 includes a lantern slide substrate 11 having a plurality of photochromic areas 12—12 disposed thereon in the form of rows and columns, and including the photochromic area 16.

In a practical embodiment, the information retaining member 10 is disposed between a plurality of radiant energy sources 13, 14 and 15, each of which is forced upon the specific discrete area 16, with a sensor element 17 being disposed on the opposite side of the element and in viewing relationship to the energy sources. The source 13 is capable of emitting radiation in the ultraviolet range such as in the range of about 3,900 angstroms, this being useful for "writing" into the discrete area of bistable photochromic material 16 by continuing the exposure until the material in the discrete area 16 is converted to the red state for converting the yellow form to the red form, radiation in the range of from about 3,500 angstroms to about 4,100 angstroms may be utilized, the optimum range being from between about 3,850 angstroms up to about 3,900 angstroms. The radiation source 14 is adapted for use as a reading or interrogating source and preferably emits short pulses of radiation in the range of about 4,800 angstroms, these pulses of radiation being sensed by the sensor 17 for interrogating the material, radiation is utilized having a spectral range which substantially coincides with that certain spectral range wherein a maximum difference exists between the transmission curves of the various forms being sensed or observed. Radiation source 15 emits radiation in the range of 5,000 angstroms at an intensity sufficient to convert the discrete area of photochromic substance 16 to the yellow state, the energy of the source being sufficient to convert or restore the sensitive area to this state in a short interval of time. The sensor 17 is sensitive to the level or degree at which radiation is transmitted by the photochromic material 16 while in one or the other of its stable states, and can thereby discriminate between the state of the photochromic material. Thus, the sensor is capable of detecting the quantity or intensity of radiation which is transmitted from the interrogating source by the photochromic material. The sensor 17 may thereby provide an indication of the specific bistable state of the discrete area of photochromic material 16, and this indication of state may be, of course, translated into a "0" or "1" binary state for data processing applications. If desired, the radiation source 14 which functions as an interrogation radiation source may serve a dual function of the interrogating radiation source 14 and the writing radiation source 15. Also, if desired, the various radiation sources may be provided with filters, as required, to bring the radiation spectrum into accord with the requirements of the sensitive photochromic material and also the requirement of the sensor 17.

In order to better enable those skilled in the art to practice the invention, reference is made to the following specific examples which provide specific preparation data.

EXAMPLE 1

Initially, 1 gram of "Vinylite VYHH" available from Union Carbide Corporation, New York, and 6 grams of salicylidine aniline were dissolved in 60 milliliters of acetone. A film of this solution is applied to the surface of a glass substrate by spraying or brushing, and the acetone is allowed to evaporate nearly completely. The remaining oily film is then seeded with a small quantity of solid beta salicylidine aniline-resin combination. The vinyl resin is the copolymer reaction product obtained from a reactant mixture of 87 percent vinyl chloride and 13 percent vinyl acetate. Other vinyl resins of this type may be utilized, the resins being prepared either in emulsion, in solution, or in pure material states.

EXAMPLE 2

Initially, 6 grams of salicylidine aniline and 1 gram of "Vinylite VYHH" were ground together in a mortar, and the material was thereafter spread as a thin layer of powder on the surface of a glass slide. The material on the slide was heated to about 55° C., which temperature exceeds the melting point of anil, and maintained at this temperature level until all of the resin had dissolved in the melted anil. The molten material is then permitted to cool to room temperature and seeded with a crystal of beta-salicylidine aniline as the material commences to crystallize. The seed crystal utilized may be either the solid anil or anil-resin combined.

When exposed to 150 watt-seconds per square inch of 3,900 angstroms incident radiation, a film 0.001 inch thick will readily convert a substantial portion from the inactive or stable (pale yellow) state to the ultraviolet-activated state (red). Likewise, visible light of wave length 4,300 to 5,800 angstroms causes the reverse change at a similar rate for radiation of a similar intensity. When heated to a temperature of 40° C., about 50 percent of the activated material will revert back to the inactive or stable state in about six hours. While the material is substantially stable in either state, that is, in either the inactive state or the activated state, periodic pulses may be cumulative and the anil may convert upon repeated exposure. Thus the interrogating pulses must be of low intensity, therefore making light transmission techniques more valuable to this situation. In the normal or yellow state, the material composition has an optical density of about 0.95, while in the activated or red state, the material has an optical density of about 0.30.

It will, of course, be understood that various changes may be made in the form, details, arrangements, and proportions of the components without departing from the scope of my invention.

What is claimed:

1. Photochromic means comprising a film of beta salicylidine aniline dispersed in a vinyl polymer binder consisting essentially of the reactant product of vinyl acetate and vinyl chloride, the film being applied on a substrate surface.

2. The photochromic means as defined in claim 1 being particularly characterized in that said vinyl binder comprises between 5 percent and 30 percent of the mixture, the balance being beta-salicylidine aniline.

3. Photochromic means comprising a film of beta salicylidine aniline coated on the surface of a substrate, the film being disposed in a vinyl binder, the vinyl binder consisting essentially of a polymer which is the reaction product of a mixture of from about 85 percent to about 95 percent vinyl chloride, 5 percent to 15 percent vinyl acetate, and from 0 percent to about 6 percent vinyl alcohol.

4. The photochromic means as defined in claim 3 being particularly characterized in that said binder comprises 87 percent vinyl chloride, balance vinyl acetate.

5. The photochromic means as defined in claim 3 being particularly characterized in that said binder comprises between about 5 percent and 30 percent of the film, the balance of the film being beta-salicylidine aniline.

6. The method of preparing a photochromic film which comprises forming a dispersion of beta-salicylidine aniline and a copolymer which is the reaction product of between about 85 percent and 95 percent vinyl chloride, about 5 percent to about 15 percent vinyl acetate, and from 0 percent to about 6 percent vinyl alcohol, in a low boiling ketone, placing said dispersion on the surface of a substrate, evaporating the said ketone to form a super saturated film dispersion on said surface, and thence seeding the dispersion with beta-salicylidine aniline to form a photochromic film as a coating on said surface.

7. The method as set forth in claim 6 wherein said low boiling ketone is selected from the group consisting of acetone, methylisobutyl ketone, and cyclohexanone.

8. The method of preparing a photochromic material which method comprises forming a dispersion of beta salicylidine aniline and a copolymer which is the reaction product of between about 85 percent and 95 percent vinyl chloride, about 5 percent to about 15 percent vinyl acetate, and from 0 percent to about 6 percent vinyl alcohol, in a low boiling ketone, evaporating the said ketone to form a super saturated dispersion with the copolymer composition comprising between about 5 percent and 30 percent of the dispersion, applying the dispersion to the surface of a substrate, and thence seeding the mixture with beta salicylidine aniline.

9. The method as set forth in claim 8 wherein said low boiling ketone is selected from the group consisting of acetone, methylisobuthyl ketone, and cyclohexanone.

References Cited

UNITED STATES PATENTS

| 1,006,195 | 10/1911 | Frasch | 117—100 X |
| 3,090,687 | 5/1963 | Berman | 350—160 X |
| 3,314,795 | 4/1967 | Dorion et al. | 96—90 |
| 3,329,502 | 7/1967 | Ullman | 96—90 |
| 3,329,648 | 7/1967 | Chopoorian | 350—160 X |

OTHER REFERENCES

Wettermark et al.: "Transient Species in the Photolysis of Anils," *The Journal of Chemical Physics*, volume 40, No. 6, Mar. 15, 1964, pp. 1486–1487.

WILLIAM D. MARTIN, *Primary Examiner.*

M. R. P. PERRONE, Jr., *Assistant Examiner.*

U.S. Cl. X.R.

96—90; 117—124; 252—300; 260—32.8, 41; 350—160